(12) United States Patent
Plantan

(10) Patent No.: US 9,062,728 B2
(45) Date of Patent: Jun. 23, 2015

(54) HINGED TABLE BRAKE SHOE

(71) Applicant: Bendix Spicer Foundation Brake LLC, Elyria, OH (US)

(72) Inventor: Ronald S. Plantan, Mooresville, NC (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 57 days.

(21) Appl. No.: 13/904,323

(22) Filed: May 29, 2013

(65) Prior Publication Data

US 2014/0353101 A1 Dec. 4, 2014

(51) Int. Cl.
*F16D 65/08* (2006.01)
*F16D 51/20* (2006.01)

(52) U.S. Cl.
CPC .............. *F16D 65/08* (2013.01); *F16D 51/20* (2013.01)

(58) Field of Classification Search
CPC ......... F16D 51/02; F16D 65/08; F16D 51/18; F16D 51/50
USPC ................. 188/78, 250 B, 250 C, 324–341
See application file for complete search history.

(56) References Cited

U.S. PATENT DOCUMENTS

| | | | |
|---|---|---|---|
| 1,117,366 A | 11/1914 | Gallagher | |
| 1,561,701 A | 11/1925 | Down | |
| 1,619,718 A | 3/1927 | Girling | |
| 1,673,416 A | 6/1928 | McConkey | |
| 1,729,139 A | 9/1929 | Thompson | |
| 1,796,433 A | 3/1931 | Blume | |
| 1,827,081 A | 10/1931 | Gillies | |
| 1,919,974 A | 7/1933 | Blume | |
| 2,236,311 A | 3/1941 | Eksergian | |
| 2,568,777 A | 9/1951 | Super | |
| 2,778,470 A | 1/1957 | Goldberg | |
| 2,910,162 A | 10/1959 | Goldberg | |
| 2,985,260 A | 5/1961 | White | |
| 3,136,390 A * | 6/1964 | Zukowski | 188/341 |
| 3,314,509 A | 4/1967 | Pelikan | |
| 3,650,360 A * | 3/1972 | King et al. | 188/330 |
| 3,677,376 A * | 7/1972 | Barajas | 188/341 |
| 3,894,620 A * | 7/1975 | Goldberg | 192/75 |
| 4,157,747 A * | 6/1979 | Getz et al. | 188/341 |
| 4,206,834 A * | 6/1980 | Williams | 188/341 |
| 4,648,491 A * | 3/1987 | Taylor | 188/341 |
| 4,936,426 A * | 6/1990 | Chatman et al. | 188/330 |
| 5,325,945 A * | 7/1994 | Walker | 188/341 |
| 5,443,135 A * | 8/1995 | Redgrave | 188/250 F |
| 5,607,034 A * | 3/1997 | Edwards et al. | 188/250 A |

(Continued)

FOREIGN PATENT DOCUMENTS

DE          1475310 A1    9/1971
WO     WO 2009-007505 A1  1/2009

*Primary Examiner* — Thomas J Williams
*Assistant Examiner* — Mariano Sy
(74) *Attorney, Agent, or Firm* — Reising Ethington, P.C.

(57) ABSTRACT

A brake shoe for a drum brake is provided. The brake shoe includes an arcuate brake table defining a radially outer side configured to receive a brake lining and a radially inner side opposite the radially outer side. The brake table further defines a plurality of sleeves proximate a first end of the brake table. The sleeves are aligned along an axis and axially spaced from one another. Each of the sleeves is configured to receive an anchor pin therein through which the brake shoe may be pivotally coupled to a brake spider. The sleeves are disposed about more than half of a perimeter of the anchor pin.

20 Claims, 5 Drawing Sheets

(56) References Cited

U.S. PATENT DOCUMENTS

| | | | |
|---|---|---|---|
| 5,941,349 A | | 8/1999 | Krumm, Sr. |
| 6,131,710 A | * | 10/2000 | Power .......................... 188/330 |
| 6,742,233 B2 | | 6/2004 | Wirth |
| 6,772,865 B2 | | 8/2004 | Catania |
| 2002/0023808 A1 | | 2/2002 | Krumm, Sr. |

* cited by examiner

HINGED TABLE BRAKE SHOE

BACKGROUND OF THE INVENTION a. Field of the Invention

This invention relates to a drum brake. In particular, the invention relates to an improved brake shoe for a drum brake that enables more consistent brake dynamics, control and performance as compared to conventional brakes.

b. Background Art

In a conventional drum brake, a brake drum rotates with a wheel or wheels proximate to one end of an axle. The drum defines a radially inner braking surface. A brake spider is disposed about the axle and a pair of brake shoes are pivotally mounted at one end to the brake spider. The opposite end of each brake shoe is engaged by an actuating member such as a cam or hydraulic piston or wedge to move the brake shoes between positions of engagement and disengagement with the braking surface of the brake drum.

Although drum brakes are generally less expensive than disc brakes, drum brakes may suffer from inconsistent brake dynamics, control and performance as compared to conventional disc brakes. For example, drum brakes have a self-energizing characteristic. During braking, rotation of the brake drum imposes a force urging the leading brake shoe into engagement with the braking surface of the brake drum (while urging the trailing brake shoe out of engagement with the braking surface of the brake drum). This characteristic often results in application of a braking force greater than desired at low speeds, but less than desired at high speeds and is particularly pronounced when using friction materials with a relatively high coefficient of friction. Further, this characteristic results in uneven braking forces applied by the leading and trailing brake shoes with the difference in braking force applied by the shoes increasing as the coefficient of friction increases. This characteristic also results in uneven wear on the brake shoes. Conventional drum brakes also require the use of relatively large anchor pins to pivotally couple the brake shoes to the brake spider. Because the pins are relatively large, the radial distance from the center of the brake to the pivot axis of the anchor pin is relatively small. The relatively small radial distance increases the self-energizing characteristic of the brake and results in even greater variance in the braking force between leading and trailing brake shoes.

Conventional brakes shoes for drum brakes also may have difficulty in handling certain loads in view of their construction. A conventional brake shoe includes a brake table that supports the brake lining and multiple webs that support the brake table and couple the brake shoe to the anchor pin and actuating member at opposite ends. As a result of this configuration, the webs must both support the brake table and carry loads from the anchor pins and actuating member. The webs therefore are made from relatively heavy materials and must be machined to provide appropriate engagement surfaces.

The inventor herein has recognized a need for a brake shoe that will minimize and/or eliminate one or more of the above-identified deficiencies.

BRIEF SUMMARY OF THE INVENTION

The present invention relates to a brake. In particular, the invention relates to an improved brake shoe for a drum brake that enables more consistent brake dynamics, control and performance as compared to conventional brakes.

A brake shoe for a drum brake in accordance with one embodiment of the present invention includes an arcuate brake table defining a radially outer side configured to receive a brake lining and a radially inner side opposite the radially outer side. The brake table further defines first and second sleeves proximate a first end of the brake table. The first and second sleeves are aligned along an axis and axially spaced from one another. Each of the first and second sleeves is configured to receive an anchor pin therein and is disposed about more than half of a perimeter of the anchor pin.

A brake assembly in accordance with one embodiment of the present invention includes a brake spider having a central aperture configured to receive an axle extending therethrough. The brake further includes a first brake shoe having a first end coupled to the brake spider through a first anchor pin. The first brake shoe includes an arcuate brake table defining a radially outer side configured to receive a first brake lining and a radially inner side opposite the radially outer side. The brake table further defines first and second sleeves proximate a first end of the brake table. The first and second sleeves are aligned along a first axis and axially spaced from one another. Each of the first and second sleeves is configured to receive the first anchor pin therein and is disposed about more than half of a perimeter of the first anchor pin. The brake further includes a second brake shoe having a first end coupled to the brake spider through a second anchor pin. The second brake shoe includes an arcuate brake table defining a radially outer side configured to receive a second brake lining and a radially inner side opposite the radially outer side of the second brake shoe. The brake table of the second brake shoe further defines first and second sleeves proximate a first end of the brake table of the second brake shoe. The first and second sleeves of the brake table of the second brake shoe are aligned along a second axis and axially spaced from one another. Each of the first and second sleeves of the brake table of the second brake shoe is configured to receive the second anchor pin therein and is disposed about more than half of a perimeter of the second anchor pin. The brake further includes an actuating member in engagement with a second end of each of the first and second brake shoes. Movement of the actuating member causes the first and second brake shoes to move between positions of engagement and disengagement with a braking surface.

A brake in accordance with the present invention represents an improvement relative to conventional brakes. The improved brake shoe enables the use of small diameter anchor pins in the brake. As a result, the radial distance from the center of the brake to the center of the anchor pins is increased thereby reducing the self-energizing effect of the brake and the difference in braking forces between the leading and trailing shoes (particularly when used with materials having higher friction coefficients). The brake shoe also enables a stiffer brake shoe at the point of engagement with the anchor pins than in conventional designs and frees the webs from transmitting loads from the pins to the brake table. The design therefore improves the structural integrity of the brake shoe while also allowing reductions in the weight and manufacturing cost of the webs. The brake shoe also facilitates the use of bushings on the anchor pin to reduce friction.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
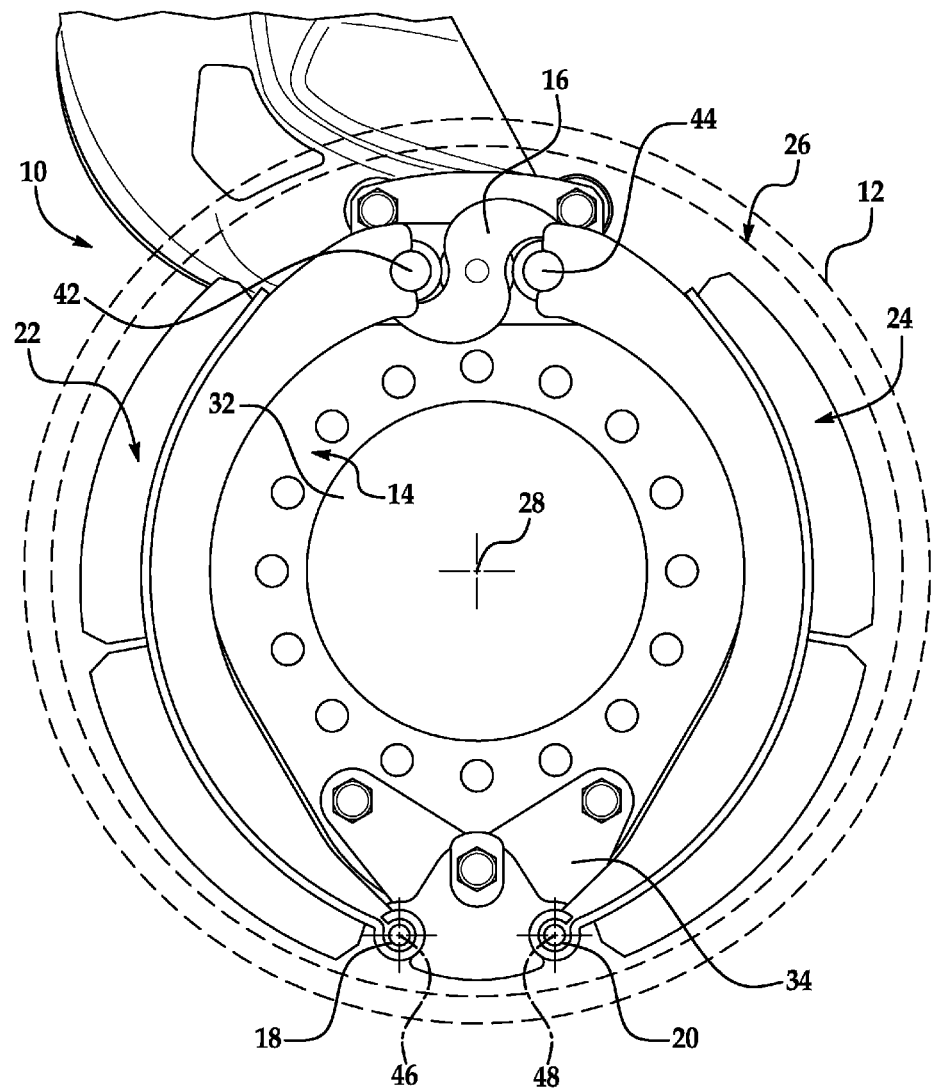
FIG. 1 is a plan view of a brake in accordance with one embodiment of the present invention.
Figure 2:
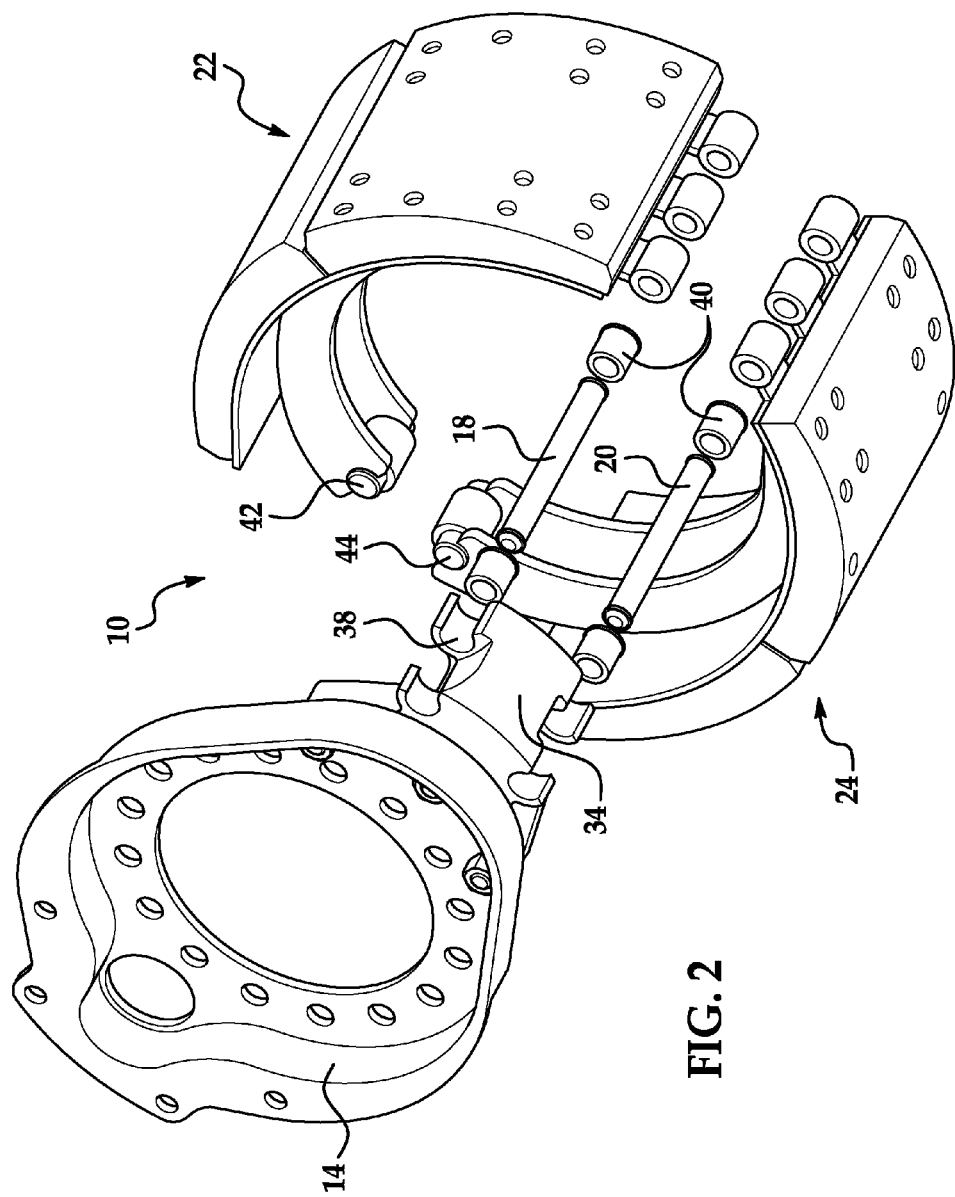
FIG. 2 is an exploded perspective view of the brake of FIG. 1.
Figure 3:
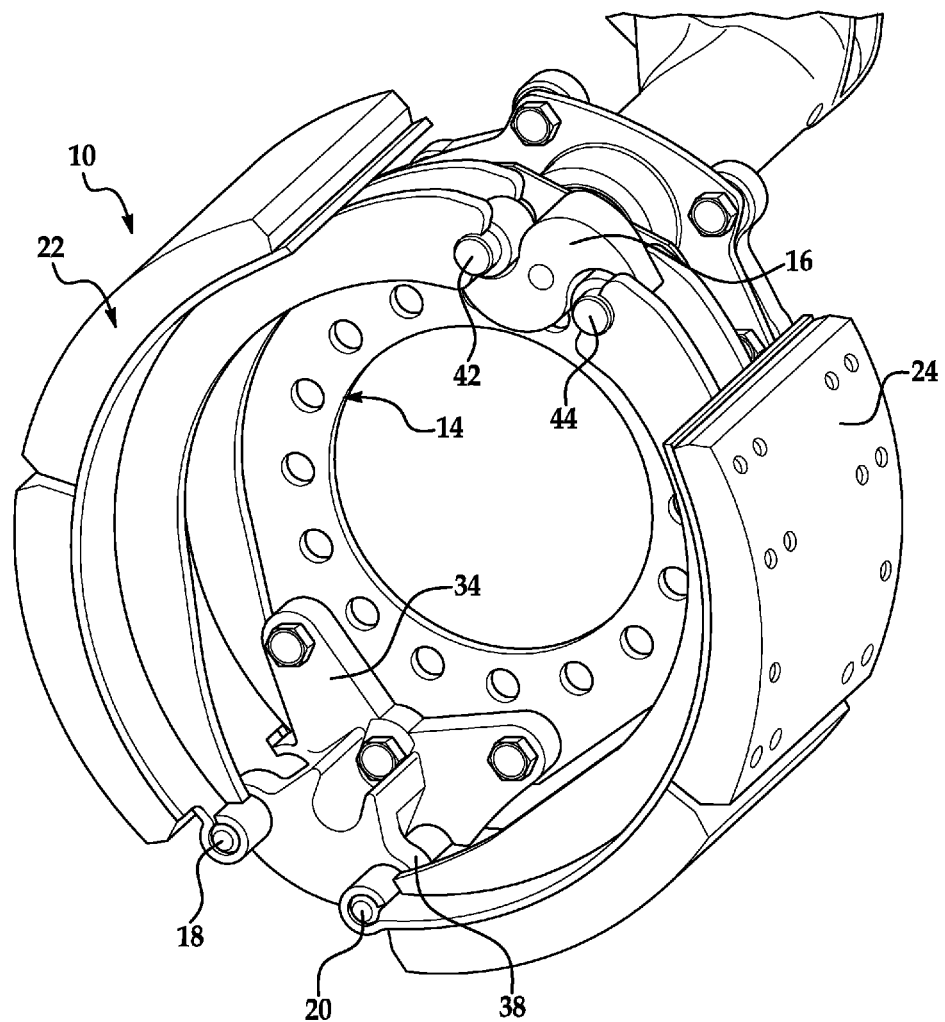
FIGS. 3-4 are perspective view of the brake of FIG. 1.

Referring now to the drawings wherein like reference numerals are used to identify identical components in the various views, FIGS. 1-4 illustrate a brake assembly 10 in accordance with one embodiment of the present invention. Brake assembly 10 is particularly adapted for use in heavy trucks. It should be understood, however, that brake assembly 10 may be used on a wide variety of vehicles and in non-vehicular applications. Brake assembly 10 is configured to act against a brake drum 12 (shown by phantom lines) and may include a brake spider 14, an actuating member 16, anchor pins 18, 20 and a pair of brake shoes 22, 24. Brake assembly 10 may also include other conventional components not discussed in detail herein including, for example, mounting brackets and hardware and an adjuster.

Brake drum 12 provides a braking surface 26 and is conventional in the art. Drum 12 may be made from conventional metals and metal alloys such as steel or cast iron. Drum 12 is annular and rotates with the vehicle wheel or wheels at one end of an axle about a central axis 28 extending through the axle (and into and out of drawing in FIG. 1).

Brake spider 14 is provided to mount the various components of brake assembly 10. Spider 14 defines a central aperture 32 through which the vehicle axle may extend. Spider 14 may further include an aperture through which a camshaft (not shown) supporting actuating member 16 extends. In accordance with one aspect of the present invention, a portion of spider 14 defines a mounting bracket 34 configured to receive and support anchor pins 18, 20. Bracket 34 defines one or more U-shaped bearings 38 extending from opposite sides of bracket 34. Bearings 38 define a recess configured to receive bushings 40 through which pins 18, 20 extend. In the illustrated embodiment, for example, bearings 38 define semicircular recesses configured to receive bushings 40 and pins 18, 20. In the illustrated embodiment, bracket 34 defines two bearings 38 extending from each side of bracket 34 that are spaced from one another along the axis of a corresponding anchor pin 18, 20. Each bearing 38 is configured to receive a corresponding bushing 40 and anchor pin 18, 20 and is configured such that the bearing 38 is disposed about no more than half of a perimeter of the bushing 40 and pin 18, 20 (e.g., no more than half the circumference of a rounded bushing 40 and a rounded pin 18, 20). As a result, pins 18, 20 (and shoes 22, 24 as described below) are supported on spider 14, but may be easily removed from spider 14 for maintenance or replacement.

Actuating member 16 is provided to cause movement of brake shoes 22, 24 between positions of engagement with and disengagement from braking surface 26 of drum 12. In the illustrated embodiment, actuating member 16 comprises a conventional doubled lobed S-cam that may be supported on a camshaft (not shown) extending through spider 14. Cam followers 42, 44 coupled to one end of brake shoes 22, 24, respectively, follow the surface of actuating member 16 as it rotates thereby causing shoes 22, 24 to pivot about axes defined by anchor pins 18, 20. Although actuating member 16 comprises an S-cam in the illustrated embodiment, it should be understood that conventional fluid actuated pistons or a wedge type mechanism may also be employed to move shoes 22, 24 between positions of engagement with and disengagement from braking surface 26.

Anchor pins 18, 20 are provided to pivotally mount brake shoes 22, 24, respectively, to brake spider 14. Anchor pins 18, 20 may comprise round pins having central axes 46, 48 that are parallel to one another and to axis 28. Anchor pins 18, 20 are configured to be received within bushings 40 and bearings 38 of bracket 34 of spider 14 and by brake shoes 22, 24 as described in greater detail hereinbelow. In accordance with one aspect of the present invention, pins 18, 20 may be smaller in diameter than conventional anchor pins thereby increasing the radial distance from axis 28 to axes 46, 48 and reducing the self-energizing effect of the brake and the difference in braking forces between the leading and trailing shoes (particularly when used with materials having higher friction coefficients).

Figure 4:
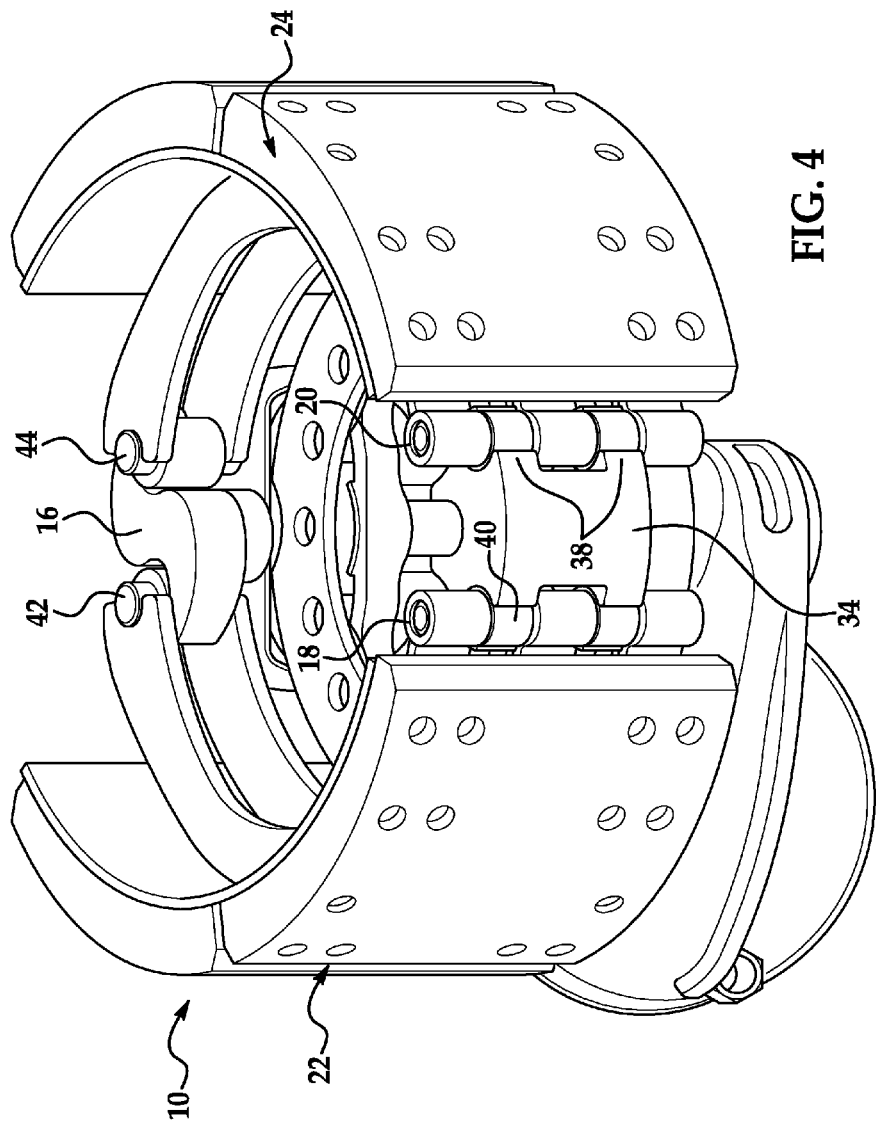
Figure 5:
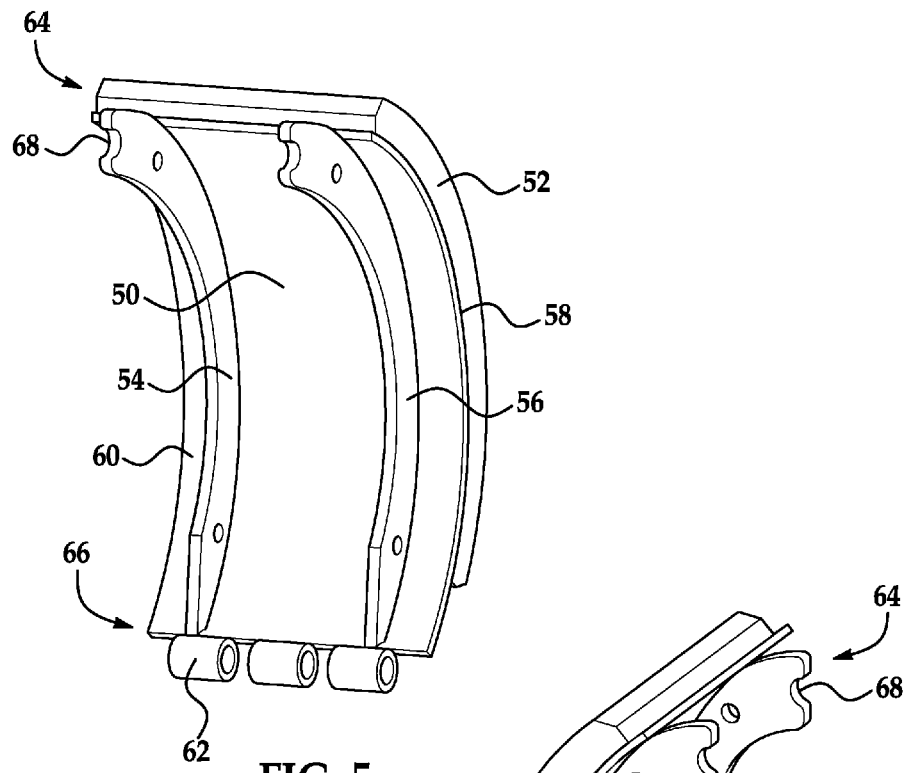
FIGS. 5-6 are perspective views of a brake shoe in accordance with one embodiment of the present invention.
Figure 6:
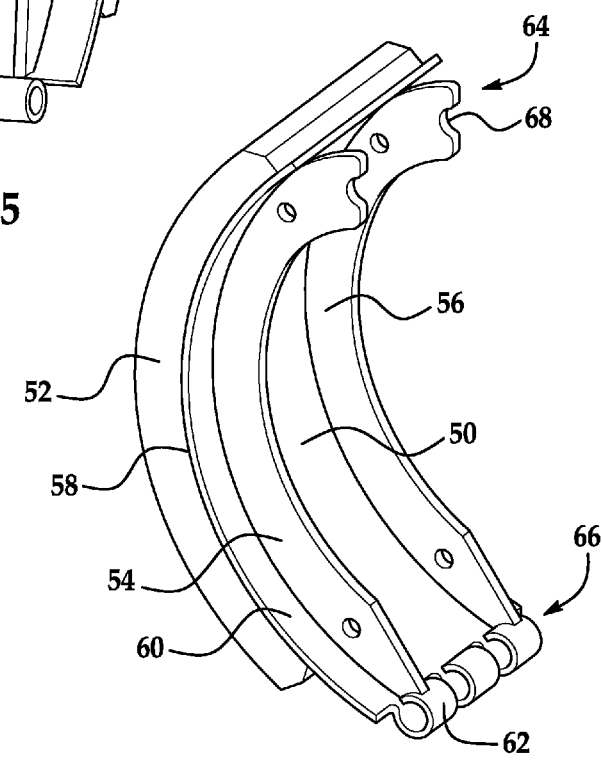

Brake shoes 22, 24 are provided for selective engagement with braking surface 26 of drum 12 in order to apply a braking torque to drum 12 and one or more wheels. Referring to FIGS. 4-5, each brake shoe 22, 24 may include a brake table 50, a brake lining 52, and a pair of spaced webs 54, 56.

Brake table 50 is provided to support brake lining 52. Table 50 may be made from conventional metals and metal alloys including steel. Table 50 is arcuate in shape and defines a radially outer side 58 configured to receive brake lining 52 and a radially inner side 60 opposite the radially outer side 58. In accordance with one aspect of the present invention, brake table 50 defines a plurality of sleeves 62 proximate one end of brake table 50. Sleeves 62 are configured to receive a corresponding anchor pin 18 or 20. Pins 18, 20 may engage sleeves 62 in an interference fit and be crimped at either end to fix pins 18, 20 against movement relative to sleeves 62. Bushings 40 may be disposed about pins 18 or 20 between adjacent sleeves 62 and are configured to be received within bearings 38 of mounting flange 34. Sleeves 62 are aligned along the axis 46, 48 of the pin 18, 20 and are axially spaced from one another. Upon assembly of brake 10, bearings 38 from mounting bracket 34 on spider 14 extend into the spaces between sleeves 62 such that bearings 38 and bushings 40 alternate with sleeves 62 and are disposed about portions of anchor pin 18 or 20 between those portions of the anchor pin 18 or 20 disposed within sleeves 62. In the illustrated embodiment, shoes 22, 24 each include three sleeves 62. This arrangement creates four points of shear along pin 18 or 20 as opposed to two points of shear in current brake shoe designs in which the brake shoe webs engage the anchor pins. The additional points of shear further facilitate the use of smaller diameter pins 18, 20 (e.g., in one embodiment, the diameter of the pin may be between about 0.625 and 0.75 inches as opposed to a conventional pin diameter of 1.0 to 1.5 inches). In contrast to bearings 38, sleeves 62 are disposed about more than half of a perimeter of anchor pin 18 or 20 (e.g., about more than half a circumference of a rounded pin). In the illustrated embodiment, sleeves 62 do not extend about the entire perimeter of pin 18 or 20. It should be understood, however, that sleeves 62 may be formed in a manner such that they extend about the entire perimeter of pin 18 or 20 or, alternatively, a weld may be used to close any gap between circumferential ends of sleeve 62. When replacement or maintenance of pins 18, 20 or shoes 22, 24 is required, the assembly of a corresponding shoe 22 or 24, and pin 18 or 20 may be removed from spider 14 by moving pin 18 or 20 outward (substantially perpendicular to axis 48 or 50) from bearings 38 on mounting bracket 34.

Brake lining 52 is provided for frictional engagement with braking surface 26 of drum 12. Lining 52 may be made from conventional friction materials. Brake lining 52 may be secured to brake table 50 using a plurality of rivets or other conventional fasteners. Although a single brake lining 52 is shown in the illustrated embodiment, it should be understood that each brake shoe 22, 24 may include a plurality of brake linings 52.

Webs 54, 56 are provided to support brake table 50 and may extend generally parallel to one another. Webs 54, 56 may be made from metals and metal alloys such as steel. In accordance with one aspect of the present invention, webs 54, 56 may be made from materials having less weight than conventional webs because webs 54, 56 do not transfer loads from a corresponding pin 18 or 20 to brake table 52. Further, webs 54, 56 may be made comprise a stamped part with little or no machining thereby reducing the cost of manufacturing webs 54, 56. Webs 54, 56 are arcuate in shape and extend between opposite ends 64, 66 of brake shoes 22, 24. Webs 54, 56 may be secured to brake table 50 using welds or other conventional fastening means. Webs 54, 56 may define aligned semicircular recesses 68 proximate end 64 configured to receive a corresponding one of cam followers 42, 44. The opposite end of each web 54, 56 may abut or contact a corresponding sleeve 62 in brake shoe 22 or 24. Webs 54, 56 may also provide a connection point for tension springs (not shown) used to retain brake shoes 22, 24 in engagement with actuating member 16 and pins 18, 20 within bearings 38 and return springs (not shown) used to bias brake shoes 22, 24 to a position of disengagement from braking surface 26.

A brake assembly 10 in accordance with the present invention has several advantages relative to conventional brakes. The improved brake shoe 22, 24 enables the use of small diameter anchor pins 18, 20 in the brake 10. As a result, the radial distance from the center 28 of the brake to the center 46, 48 of the anchor pins 18, 20 is increased thereby reducing the self-energizing effect of the brake and the difference in braking forces between the leading and trailing shoes (particularly when used with materials having higher friction coefficients). For example, in one embodiment the radial distance from the center of the brake to the center of the anchor pin is increased from 6.0 inches to 7.5 inches. The design of the brake shoe 22, 24 also enables a stiffer brake shoe 22, 24 at the point of engagement with the anchor pins 18, 20 than in conventional designs and frees the webs 54, 56 from transmitting loads from the pins 18, 20 to the brake table 50. The design therefore improves the structural integrity of the brake shoe 22, 24 while also allowing reductions in the weight and manufacturing cost of the webs 54, 56. The design of the brake shoe 22, 24 also facilitates the use of bushings 40 to reduce friction.

While the invention has been shown and described with reference to one or more particular embodiments thereof, it will be understood by those of skill in the art that various changes and modifications can be made without departing from the spirit and scope of the invention.

What is claimed is:

1. A brake shoe for a drum brake, comprising:
  an arcuate brake table defining a radially outer side configured to receive a brake lining and a radially inner side opposite said radially outer side;
  wherein said brake table defines first and second sleeves proximate a first end of said brake table, said first and second sleeves aligned along an axis and axially spaced from one another, each of said first and second sleeves configured to receive an anchor pin therein and disposed about more than half of a perimeter of said anchor pin;
  wherein said anchor pin is fixed against movement relative to said first and second sleeves.

2. The brake shoe of claim 1 wherein said brake table further defines a third sleeve proximate said first end of said brake table, said third sleeve aligned with said first and second sleeves along said axis and axially spaced from said first and second sleeves, said third sleeve configured to receive said anchor pin therein and disposed about more than half of said perimeter of said anchor pin.

3. The brake shoe of claim 1 further comprising a first bushing disposed between said first sleeve and said second sleeve, said first bushing configured to receive said anchor pin therein.

4. The brake shoe of claim 1 further comprising a first web disposed on said radially inner side of said brake table of said brake shoe, said first web extending from said first end of said brake shoe to a second end of said brake shoe, opposite said first end of said brake shoe.

5. The brake shoe of claim 4 further comprising a second web disposed on said radially inner side of said brake shoe, said second web extending from said first end of said brake shoe to said second end of said brake shoe, opposite said first end of said brake shoe.

6. The brake shoe of claim 5 wherein said first web contacts said first sleeve and said second web contacts said second sleeve.

7. The brake shoe of claim 6 wherein said brake table further defines a third sleeve proximate said first end of said brake table and between said first and second sleeves, said third sleeve aligned with said first and second sleeves along said axis and axially spaced from said first and second sleeves, said third sleeve configured to receive said anchor pin therein and disposed about more than half of said perimeter of said anchor pin.

8. The brake shoe of claim 1 wherein said first and second sleeves are disposed about all of said perimeter of said anchor pin.

9. The brake shoe of claim 1 wherein said anchor pin engages said first and second sleeves in an interference fit.

10. A brake assembly, comprising:
  a brake spider having a central aperture configured to receive an axle extending therethrough;
  a first brake shoe having a first end coupled to said brake spider through a first anchor pin, said first brake shoe including an arcuate brake table defining a radially outer side configured to receive a first brake lining and a radially inner side opposite said radially outer side, said brake table forming first and second sleeves proximate a first end of said brake table, said first and second sleeves aligned along a first axis and axially spaced from one another, each of said first and second sleeves configured to receive said first anchor pin therein and disposed about more than half of a perimeter of said first anchor pin;
  a second brake shoe having a first end coupled to said brake spider through a second anchor pin, said second brake shoe including an arcuate brake table defining a radially outer side configured to receive a second brake lining and a radially inner side opposite said radially outer side of said second brake shoe, said brake table of said second brake shoe forming first and second sleeves proximate a first end of said brake table of said second brake shoe, said first and second sleeves of said brake table of said second brake shoe aligned along a second axis and axially spaced from one another, each of said first and second sleeves of said brake table of said second brake shoe configured to receive said second anchor pin therein and disposed about more than half of a perimeter of said second anchor pin; and,
  an actuating member in engagement with a second end of each of said first and second brake shoes, movement of said actuating member causing said first and second brake shoes to move between positions of engagement and disengagement with a braking surface, wherein said first anchor pin is fixed against movement relative to said first and second sleeves of said first brake shoe.

11. The brake of claim 10 wherein said brake table of said first brake shoe further defines a third sleeve proximate said first end of said brake table of said first brake shoe, said third sleeve aligned with said first and second sleeves of said first brake shoe along said first axis and axially spaced from said first and second sleeves of said first brake shoe, said third sleeve configured to receive said first anchor pin therein and disposed about more than half of said perimeter of said first anchor pin.

12. The brake of claim 10 further comprising a first bushing disposed between said first sleeve of said first brake shoe and said second sleeve of said first brake shoe, said first bushing configured to receive said first anchor pin therein.

13. The brake of claim 10 further comprising a first web fastened to said radially inner side of said brake table of said first brake shoe, said first web extending from said first end of said first brake shoe to said second end of said first brake shoe.

14. The brake of claim 13 further comprising a second web fastened to said radially inner side of said brake table of said first brake shoe, said second web extending from said first end of said first brake shoe to said second end of said first brake shoe.

15. The brake of claim 14 wherein said first web contacts said first sleeve of said first brake shoe and said second web contacts said second sleeve of said first brake shoe.

16. The brake of claim 15 wherein said brake table of said first brake shoe further defines a third sleeve proximate said first end of said brake table of said first brake shoe and between said first and second sleeves of said first brake shoe, said third sleeve aligned with said first and second sleeves of said first brake shoe along said first axis and axially spaced from said first and second sleeves of said first brake shoe, said third sleeve configured to receive said first anchor pin therein and disposed about more than half of said perimeter of said first anchor pin.

17. The brake shoe of claim 10 wherein said first anchor pin engages said first and second sleeves of said first brake shoe in an interference fit.

18. A brake assembly, comprising:

a brake spider having a central aperture configured to receive an axle extending therethrough;

a first brake shoe having a first end coupled to said brake spider through a first anchor pin, said first brake shoe including an arcuate brake table defining a radially outer side configured to receive a first brake lining and a radially inner side opposite said radially outer side, said brake table forming first and second sleeves proximate a first end of said brake table, said first and second sleeves aligned along a first axis and axially spaced from one another, each of said first and second sleeves configured to receive said first anchor pin therein and disposed about more than half of a perimeter of said first anchor pin;

a second brake shoe having a first end coupled to said brake spider through a second anchor pin, said second brake shoe including an arcuate brake table defining a radially outer side configured to receive a second brake lining and a radially inner side opposite said radially outer side of said second brake shoe, said brake table of said second brake shoe forming first and second sleeves proximate a first end of said brake table of said second brake shoe, said first and second sleeves of said brake table of said second brake shoe aligned along a second axis and axially spaced from one another, each of said first and second sleeves of said brake table of said second brake shoe configured to receive said second anchor pin therein and disposed about more than half of a perimeter of said second anchor pin; and, an actuating member in engagement with a second end of each of said first and second brake shoes, movement of said actuating member causing said first and second brake shoes to move between positions of engagement and disengagement with a braking surface;

wherein said brake spider includes a mounting bracket configured to receive said first and second anchor pins, said mounting bracket disposed about no more than half of said perimeter of said first anchor pin and no more than half of said perimeter of said second anchor pin.

19. The brake of claim 18 wherein said mounting bracket is disposed about a portion of said first anchor pin disposed between said first and second sleeves of said first brake shoe and a portion of said second anchor pin disposed between said first and sleeves of said second brake shoe.

20. The brake of claim 18 wherein said first and second sleeves of said first brake shoe are disposed about all of said perimeter of said first anchor pin.

\* \* \* \* \*